(12) United States Patent
Eshaghi et al.

(10) Patent No.: US 12,301,312 B2
(45) Date of Patent: May 13, 2025

(54) PHOTONIC COMPUTING SYSTEM AND METHOD FOR WIRELESS COMMUNICATION SIGNAL PROCESSING

(71) Applicant: HUAWEI TECHNOLOGIES CANADA CO., LTD., Kanata (CA)

(72) Inventors: Armaghan Eshaghi, Kanata (CA); Mahsa Salmani, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 167 days.

(21) Appl. No.: 18/205,286

(22) Filed: Jun. 2, 2023

(65) Prior Publication Data

US 2023/0387968 A1 Nov. 30, 2023

Related U.S. Application Data

(63) Continuation of application No. PCT/CA2020/051654, filed on Dec. 2, 2020.

(51) Int. Cl.
*H04B 7/04* (2017.01)
*G06N 10/40* (2022.01)
*H04B 7/0413* (2017.01)

(52) U.S. Cl.
CPC ........... *H04B 7/0413* (2013.01); *G06N 10/40* (2022.01)

(58) Field of Classification Search
CPC ........ H04B 7/0413; H04B 1/40; G06N 10/40; G06N 3/0675; G06F 17/16

(Continued)

(56) References Cited

U.S. PATENT DOCUMENTS

2011/0131463 A1* 6/2011 Gunnam .................. G06F 17/16
714/752
2014/0181171 A1 6/2014 Dourbal
(Continued)

FOREIGN PATENT DOCUMENTS

CN 110874206 A 3/2020

OTHER PUBLICATIONS

A. Tait et al. "Broadcast and Weight: An Integrated Network For Scalable Photonic Spike Processing", Journal of Lightwave Technology, vol. 32, No. 21, Nov. 1, 2014.

*Primary Examiner* — Emmanuel Bayard

(57) ABSTRACT

Matrix multiplication is performed using a photonic computing block. Matrices are preprocessed to derive representative positive, real-valued matrices. The representative matrices are multiplied using a photonic computing block in which elements of a first matrix are encoded as a signal intensity and elements of a second matrix are encoded by tuning a spectral filter to apply a corresponding weight coefficient. Pairwise multiplications of matrix elements are performed by processing different wavelength components of an overall optical signal. A balanced photodiode receives the different wavelength components following manipulation in order to complete the multiplication. A matrix multiplication can be partitioned to fit a photonic computing block. The partitions are processed in parallel by multiple photonic computing blocks then reassembled into a final matrix. The multiplication operation can be part of a matrix inversion operation. Applications include (massive) multiple input multiple output (MIMO) precoding and detection, beamforming and other wireless communication applications.

16 Claims, 8 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2020/0019587 A1* | 1/2020 | Pescianschi | G06F 17/16 |
| 2020/0334576 A1* | 10/2020 | Lazovich | G06N 3/084 |
| 2021/0201126 A1* | 7/2021 | Meng | G02F 3/00 |
| 2022/0179159 A1* | 6/2022 | Wu | G02B 6/4271 |

* cited by examiner

PHOTONIC COMPUTING SYSTEM AND METHOD FOR WIRELESS COMMUNICATION SIGNAL PROCESSING

CROSS REFERENCE TO RELATED APPLICATIONS

This application is a continuation of International Patent Application No. PCT/CA2020/051654 filed Dec. 2, 2020 entitled "PHOTONIC COMPUTING SYSTEM AND METHOD FOR WIRELESS COMMUNICATION SIGNAL PROCESSING", the contents of which are incorporated herein by reference.

BACKGROUND OF THE INVENTION

The processing units of radio transceivers in wireless communication systems have so far been based on Digital Signal Processors (DSP) or, when more complex and challenging signal processing is required, on Field Programmable Gate Arrays (FPGA). These types of processors have an upper speed limitation in the range of about 1 GHz, which limits the performance of an overall system. Future massive multiple-input multiple-output (MIMO) systems will be specifically vulnerable to this limitation and will require a significantly new solution.

Parallelization can help overcome this processor speed limitation but at the cost of a higher latency and a significant overhead. Specialized application-specific integrated circuits (ASICs) are another possibility, but these are costly, require significant development time, and have limited reconfigurability.

In recent years, FPGAs, and many-core architectures, such as graphics processing units (GPU) have been developed to address high-performance computing needs for general tasks by breaking them down using parallelization. One of the most powerful GPU architectures is Nvidia™'s Volta™, which has 640 tensor cores and 21 billion transistors, and which can deliver over 50 TMAC/s (MAC denotes the number of multiply and accumulate operations). Tens of these units are needed to meet the required computational power of the wireless system introduced above.

Another state-of-the-art architecture is Google™'s Tensor Processing Unit (TPU), which is a specialized ASIC for machine learning algorithms. Google's Cloud TPU version 3 can deliver 210 TMAC/s. Tens of these units are required to address the challenging requirements of massive MIMO systems in terms of signal processing speed. The Cloud TPU version 3 Pod can deliver over 50 PMAC/s, however, a network of boards in towers of racks is required to meet the computational power requirements.

In the neuromorphic electronics arena, IBM™'s TrueNorth™ system is currently the most powerful. It is a neuromorphic complementary metal-oxide-semiconductor (CMOS) integrated circuit with a non-von Neumann architecture. IBM™'s TrueNorth™ has 4096 cores, one million neurons and 5.4 billion transistors. The computational performance of TrueNorth™ can reach 58 giga-synaptic operations per second (GSOPS) with an energy consumption of 65 mW. While it is ten times more energy-efficient that the other most energy-efficient supercomputers, it does not provide the required computational power for the next-generation massive-MIMO processors.

The challenging computation rate essential for enabling next-generation wireless communication cannot be delivered with the current state-of-the-art technologies reviewed above. Digital electronics has an energy efficiency limit of about 1 pJ/MAC, a frequency limitation of a few GHz, and a compute density limitation of roughly 150 [GMAC/s]/mm$^2$.

A photonics-based technology used for computing is that studied in V. Bangari et al. "Digital Electronics and Analog Photonics for Convolutional Neural Networks (DEAP-CNNs)", IEEE J. Selected Topics in Quantum Electronics, vol. 26, no. 1, 2020 (hereinafter referred to as "Bengari"). That system employs a Broadcast-and-Weight architecture as detailed in A. Tait et al. "Broadcast and Weight: An Integrated Network For Scalable Photonic Spike Processing", Journal of Lightwave Technology, Vol. 32, No. 21, Nov. 1, 2014 (hereinafter referred to as "Tait"), in which different weighing coefficients (weights) are realized by tuning the transmission of signals through a series of silicon micro-ring resonators (MRR). Each MRR equivalently serves as the multiplication part of a MAC operation. Different wavelength channels of light are weighted by separate MRRs and transmitted through the same waveguide. Then, the signals are accumulated by the detection of the total power of all wavelength channels (i.e. all the narrowband optical component signals). However, this technology is still limited in scope and capability and has not been applied to certain other areas, such as calculating detection and precoding matrices for wireless communications. For example, the above-described photonics technology currently lacks the capability to handle complex- and negative-valued matrix inversions and multiplications, which is required for various wireless communication applications such as calculating detection and precoding matrices.

Therefore, there is a need for a photonic computing system and method supporting wireless communication applications, that is not subject to one or more limitations of the prior art.

SUMMARY OF THE INVENTION

To overcome the limitations associated with digital electronics processors, while maintaining a reasonable area and energy consumption, embodiments of the present invention provide for instances of photonic computing technology which are applied in particular to wireless communications applications, such as those involving detection and precoding matrices, for example for use in MIMO wireless communications systems. Because matrix inversion and matrix multiplication are significant operations used for detection and precoding, and because they are also demanding in terms of required computational power, embodiments of the present invention provide methods for applying the photonic computing technology to complex- and negative-valued matrix inversion and multiplication, for wireless communication applications.

In accordance with embodiments of the present invention, there is provided a method for supporting wireless communication operations. The method includes performing a multiplication of a pair of matrices to produce a result used in said wireless communication operations. One or both of the pair of matrices comprise complex values, negative values, or a combination thereof. The multiplication includes preprocessing, using electronics, one or both of the pair of matrices to produce one or more representative pairs of matrices for pairwise multiplication. Each of the representative pairs of matrices consists of real values, has a number of rows less than or equal to a row threshold, and has a number of columns less than or equal to a column threshold. Furthermore, a left-hand matrix of each of the representative pairs of matrices consists of non-negative values. The multiplication includes causing a photonic computing block to pairwise multiply each of the representative pairs of matrices to produce signals indicative of representative product matrices, by processing one or more optical signals using a plurality of optical modulators. The plurality of optical modulators are set based on entries of the representative pairs of matrices. The multiplication includes receiving and processing, using the electronics, the signals indicative of representative product matrices, to produce a product of the multiplication of the pair of matrices.

In accordance with embodiments of the present invention, there is provided an apparatus for supporting wireless communication operations. The apparatus is configured to perform a multiplication of a pair of matrices to produce a result used in said wireless communication operations. One or both of the pair of matrices comprise complex values, negative values, or a combination thereof. The apparatus includes electronics configured to preprocess one or both of the pair of matrices to produce one or more representative pairs of matrices for pairwise multiplication. Each of the representative pairs of matrices consists of real values, has a number of rows less than or equal to a row threshold, and has a number of columns less than or equal to a column threshold. A left-hand matrix of each of the representative pairs of matrices consists of non-negative values. The apparatus includes a photonic computing block configured to pairwise multiply each of the representative pairs of matrices to produce signals indicative of representative product matrices, by processing one or more optical signals using a plurality of optical modulators. The plurality of optical modulators are set based on entries of the representative pairs of matrices. The electronics, or additional electronics, are configured to receive and process the signals indicative of representative product matrices, to produce a product of the multiplication of the pair of matrices.

In various embodiments, multiplications are repeated iteratively to determine an approximate inverse of an initial matrix corresponding to the result. In further embodiments, the wireless communication operations include multiple-input multiple-output (MIMO) operations, and the initial matrix is used in generating a detection matrix or a precoding matrix for use in the MIMO operations.

In various embodiments, generating representative pairs of matrices consisting of real values includes generating a real representation matrix indicative of a complex-valued matrix. The real representation matrix includes in block form, an upper-left submatrix, a lower-left submatrix, an upper-right submatrix, and a lower-right submatrix. The upper-left submatrix and the lower-right submatrix both equal a real part of the complex-valued matrix. One of the upper-right submatrix and the lower-left submatrix equals an imaginary part of the complex-valued matrix. The other of the upper-right submatrix and the lower-left submatrix equals a negative of the imaginary part of the complex-valued matrix.

In various embodiments, the preprocessing to produce left-hand matrices of each of the representative pairs of matrices consisting of non-negative values comprises: representing a multiplication of a first matrix and a second matrix by a sum of: a first non-negative matrix multiplied by the second matrix; and a second non-negative matrix multiplied by a negative of the second matrix; determining a most negative entry of the first matrix; generating the first non-negative matrix from the first matrix by adding an absolute value of the most negative entry to each element of the first matrix; and generating the second non-negative matrix to be of a same size as the first matrix, with each element of the second non-negative matrix being equal to the absolute value of the most negative entry.

In various embodiments, the generating representative pairs of matrices having the number of rows less than or equal to the row threshold, and having the number of columns less than or equal to the column threshold comprises: for a first matrix and a second matrix to be multiplied together, partitioning one or both of the first matrix and the second matrix into plural submatrices, each of the plural submatrices having a number of rows less than or equal to the row threshold and having a number of columns less than or equal to the column threshold. The representative pairs of matrices comprise the plural submatrices, and processing the representative product matrices comprises performing two or more addition operations, each of the two or more addition operations comprising adding together two or more of said representative product matrices which are produced based on the multiplications involving the plural submatrices.

In various embodiments, the photonic computing block is operated to produce, by an optical signal source, a first optical signal comprising a plurality of narrowband component signals of different wavelengths. The photonics computing block is further operated to modulate, by a first modulation block, each of the plurality of narrowband component signals using a first plurality of optical modulators. Each of the first plurality of optical modulators is electronically controlled to modulate one of the narrowband component signals by an amount proportional to a corresponding positive entry in a left-hand one of the representative pairs of matrices. This is done by encoding said positive entry as a light intensity into said one of the narrowband component signals. The photonics computing block is further operated to modulate, by a second modulation block, each of the plurality of narrowband component signals using a second plurality of optical modulators. Each of said plurality of optical modulators is electronically controlled to modulate one of the narrowband component signals by another amount proportional to a corresponding positive or negative entry in a right-hand one of the representative pairs of matrices. This is done by applying said positive or negative entry as a weight to said one of the narrowband signals. The photonics computing block is further operated to process, by an accumulator, the optical signal following modulation by the first modulation block and the second modulation block. This processing includes accumulating a total power of light of the narrowband component signals. This total power of light corresponds to an entry in a product of multiplying the representative pair of matrices.

BRIEF DESCRIPTION OF THE DRAWINGS

It will be noted that throughout the appended drawings, like features are identified by like reference numerals.

DETAILED DESCRIPTION OF THE INVENTION

Massive MIMO spatial multiplexing allows for increased capacity and efficiency of wireless communication systems in high-traffic urban areas. Operation of a MIMO system typically involves online computation of detection and precoding matrices, which are used to prepare and process wireless signals transmitted and received by different antenna elements in combination. These detection and precoding matrices can be calculated based on a channel matrix, denoted by H and representing Channel State Information (CSI). As will be readily understood by a worker skilled in the art, the channel matrix H is used as a transfer function matrix to relate a transmit vector x to a receive vector y, for example through the equation y=Hx+n, where n is a noise vector. The complex-valued transmit and receive vectors represent the signals as transmitted and as received, respectively, by each antenna of the MIMO system.

There are a number of techniques for calculating detection and precoding matrices based on a channel matrix, including maximum ratio (MR), zero forcing (ZF), and minimum mean-square error (MMSE) techniques. Due to the reciprocity property of a channel between transmitter (e.g. base stations) and receivers (e.g. mobile devices), all complex signal processing can be performed at an appropriately powerful device, e.g. at a base station or computer operatively coupled thereto. However, as the number of antennas grows for fifth-generation (5G) and beyond wireless communications standards, the required signal processing becomes increasingly demanding and complex. Therefore, the computational power needed to operate a system in real-time increases significantly.

Figure 1:
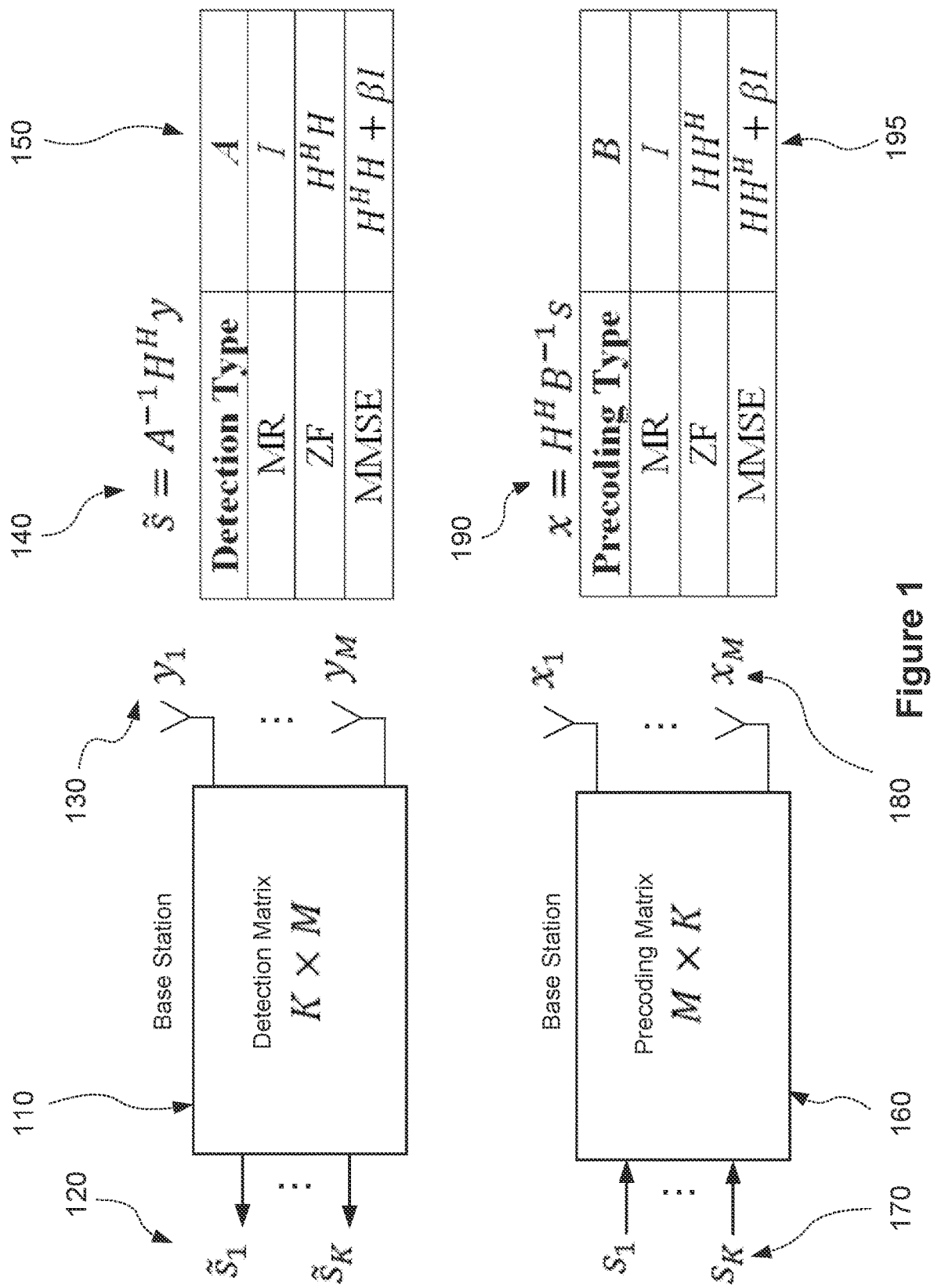
FIG. 1 illustrates MIMO detection and precoding configurations, in accordance with the prior art.

FIG. 1 illustrates relationships for generating detection matrix A and precoding matrix B, for example as can be performed at a base station. The sizes (number of rows and columns) of matrices A and B are defined by the number of mobile devices K and base station antennas M. The relationship between an input signal and an output signal is determined by a channel matrix H, and by which technique is selected between the maximum ratio (MR), the zero forcing (ZF), and the minimum mean-square error (MMSE) techniques. For a detection operation 110 at a base station, using a detection matrix A, the output vector 120 is a function of an input vector y 130, through equation 140:

$$\tilde{s}=A^{-1}H^Hy \quad (1)$$

where H is a channel matrix and A is defined by a selected detection technique 150. The output vector $\tilde{s}$ represents the signal estimates based on received signal vector y. Here and elsewhere, superscript "T" represents the matrix transpose operation, superscript "−1" represents the matrix inverse operation, and superscript "H" represents the Hermitian (conjugate transpose) operation. Matrix I is an identity matrix and β is a scalar value. For a precoding operation 160 at the base station, using a precoding matrix B, the output vector x 180 is a function of an input vector x 170, through equation 190:

$$x=H^HB^{-1}s \quad (2)$$

where H is a channel matrix and B is defined by a selected precoding technique 195. The output vector x represents the vector of signals to be transmitted based on a vector x of signals as desired to be received by the target (e.g. mobile) devices.

Next-generation wireless communication might have more than 1024 base station antennas and with at least 64 (e.g. 64 or 128) mobile devices (users) per base station. For millimeter-wave (mm-wave) 5G, the slot length can be as low as 125 µs with a subcarrier spacing of 120 kHz. Accordingly, a receiver is expected to be able to decode an uplink slot within 125 ρs. With this time slot length, a matrix inversion operation, e.g. calculating $A^{-1}$, is expected be done within 7.5 to 25 ρs. For mm-wave 5G, the number of sub-carriers can be as high as 3300, considering a 400 MHz bandwidth and a 120 KHz subcarrier spacing. These sub-carriers may be processed in parallel to allow for multi-user MIMO. Since A is a K×K matrix, and computation of $A^{-1}$ requires approximately $K^3$ ($O(K^3)$ or $O(K^3)$) multiply-and-accumulate (MAC) operations, a simple calculation gives the rate of MAC operations to be at least 440 TMAC/s ($440 \times 10^{12}$ MAC operations per second) for calculating matrix $A^{-1}$ with K=100. This rate can easily reach tens of PMAC/s for beyond-5G wireless communications. For conventional DSP- and CPU-based computing with a power-limited base station, this is extremely difficult to achieve.

It is considered that photonic processing chip can allow significantly complex operations to be performed in real-time, which can significantly offload electronic post-processing and provide a technology to make faster radiofrequency (RF)-related decisions on the fly. Photonic processing chips of various types are under development.

Embodiments of the present invention uses photonic computing technology to accelerate signal processing for wireless communication systems, including the ones that utilize MIMO technology, such as massive MIMO or multi-user MIMO. This is based on the recognition that a bottleneck in next-generation wireless communication systems is the high computation rate required for base station signal processing, which cannot feasibly be provided with current technologies. It is believed that a photonic MAC system may potentially offer significant potential improvements over digital electronics in energy ($>10^2$ improvement), speed ($>10^3$ improvement), and compute density ($>10^2$ improvement). it is further believed that such a platform may potentially achieve an energy efficiency of 2.7 fJ/MAC, a computing density of 50 [TMAC/s]/mm², and a time delay of less than 100 ρs to perform a single multiplication between a matrix and a vector with a size K of 148. These performance numbers are due to the high bandwidth of photonics, which is in the THz range. These figures of merit are orders of magnitude greater than the performances achievable with digital electronics (i.e., GPU and TPU). This means that based on current silicon photonics technology, the computational unit required for next-generation wireless communication can theoretically be as small as a single chip of 1 cm 2 on one controller board, instead of the towers of multiple boards that would be required in the case of GPUs or TPUs.

In an embodiment of the present invention, a photonics-based computing system can be implemented to accomplish multiplication, inversion, or both multiplication and inversion, of matrices having complex-valued, negative-valued, or both complex-valued and negative-valued elements, and it is suitable for wireless communication systems. Pairs of matrices can be multiplied together to produce results for use in wireless communication operations. Furthermore, the photonics-based system can be implemented along with electronic preprocessing, post-processing, or both preprocessing and post-processing, in a manner that allows for suitable types of matrices (e.g. potentially complex-valued matrices with arbitrary sign) to be multiplied together, which meets the needs of such computations in wireless communication systems.

Preprocessing refers to processing operations which are performed on data, where such data is subsequently passed to a photonics computing block of the photonics-based system. Preprocessing may, for example, be used to process input data into a format which is suitable for handling by the photonics computing block. Postprocessing refers to processing operations which are performed on data which is received from the photonics computing block. Postprocessing may, for example, be used to process data output by the photonics computing block into a form which is usable for a further purposes, such as in support of wireless communication operations. Processing of data may involve various mathematical or non-mathematical operations which process electronic data, which may be represented using analog or digital signals, or a combination thereof. Such processing and manipulation of data causes further (output) data to be produced. The generation of data, also referred to as the production of data, refers to outputting of data based on input data by processing the input data according to a particular set of operations. The data which is output is also referred to as a result. The set of operations themselves can be implemented by causing electronic components, such as logic gates, transistors, amplifiers, and other circuitry, to process electronic signals, as would be readily understood by a worker skilled in the art. In the photonic domain, the set of operations can be implemented by causing photonics components, optical modulators (e.g. MRRs), or other photonics components, to process optical signals. The manipulation is performed to produce further optical signals as output.

Multiplication of matrices involves multiplying a pair of matrices, referred to as a left-hand matrix and a right-hand matrix. The left-hand matrix is also referred to as a multiplier, and the right-hand matrix is also referred to as a multiplicand. The multiplicand is multiplied by the multiplier to produce a product. Matrix multiplication is a well understood operation which can be implemented automatically by electronic devices, and in the present invention by a combination of electronic and photonic devices. Matrix multiplication is not, in general, commutative, and thus the distinction between left-hand and right-hand matrices is important. Matrix multiplication is inherently pairwise in that a first one of a pair of matrices multiplies a second one of the same pair of matrices to produce a product matrix. As such, the present disclosure refers to pairs of matrices, with the understanding that such pairs of matrices refer to two matrices that are multiplied together.

The photonic computing block used for computing in various embodiments of the present invention employs a broadcast-and-weight architecture, in which different weighing coefficients are realized by tuning the transmission of signals through a series of tunable spectral filters such as silicon micro-ring resonators (MRRs) or other optical modulators. When a tunable filter interacts with multiple fields, weighted signal are created. Each MRR equivalently serves for a multiplication part of a MAC operation, where different wavelength channels of light are weighted by separate MRRs and transmitted through a same waveguide. A multiplication operation is therefore physically implemented as an interaction between a signal from a tunable filter and a signal from a waveguide. Then, the signals are accumulated by the detection of the total power of all wavelength channels (i.e. the total power of all narrowband component signals being modulated).

According to various embodiments, the broadcast-and-weight architecture includes an optical signal generator such as a frequency comb generator or other type of generator which produces optical signals with different wavelengths. Those signals are multiplexed using a wavelength-division-multiplexer (WDM). The signals are then processed using tunable optical filters. The tunable optical filters may be, for example, silicon microring resonators (MRRs), Mach-Zehnder Interferometer (MZI) based filters, or other types of filters. The electronic signals applied to those filters can be set to control the manner by which each of those filters affects the passing (optical) signal, depending on the wavelength. Accordingly, in the broadcast-and-weight architecture, different weighing coefficients can be realized by tuning the transmission of signals through a series tunable spectral MRRs or other optical modulators.

According to various embodiments, in order to exploit a Broadcast-and-Weight architecture to perform a matrix inversion, a polynomial expansion of the matrix inversion can be exploited such that the matrix inversion is approximately implemented by an iterative computation. Each iteration of the computation involves a couple of general matrix multiplication steps. Accordingly, the matrix inversion is numerically approximated using a set of linear matrix equations.

In this embodiment, a numerical technique used for a matrix inversion can be the Newton series approximation. If A is the matrix to be inverted (note that A now denotes an arbitrary matrix, which is not necessarily the detection matrix discussed above), the estimated inverse matrix at the n-th iteration is:

$$A_n^{-1} = A_{n-1}^{-1}[2I - AA_{n-1}^{-1}], \qquad (3)$$

where $A_0^{-1} = D^{-1}$, and D holds the diagonal elements of A with the rest of the elements being zero. Therefore, beginning with n=1, a computational implementation of Equation (3) can be performed. Then, n can be incremented by one and the process can be repeated. The process can be repeated iteratively an arbitrary number of times, for example a predetermined number of times or until a sufficient convergence condition is reached, in order to determine an approximate inverse of an initial matrix A. For example, where the present invention is used in support of MIMO operations, the initial matrix A being inverted may be used in generating a MIMO detection matrix or a MIMO precoding matrix.

It is noted that, under certain conditions, the Newton series approximation for the inverse is suitably close to the actual matrix inverse. Such a condition is that $\|I - AA_0^{-1}\| < 1$. This condition typically holds in MIMO systems, because the Gram matrix is a diagonally dominant matrix. As will be readily understood by a worker skilled in the art, numerical approximation techniques such as the Newton series approximation are typically only guaranteed to produce an approximate result, such as an approximate inverse. An approximate inverse can be deemed to be determined if the approximation is suitably close to the "true" inverse for a given practical application. For supporting wireless communication operations, the degree to which an approximation is suitably close to a true value will be readily understood by a worker skilled in the art. When produced by an iterative or other method, it will be readily understood that the term "inverse," as used herein, refers to an approximate inverse.

By implementing the above numerical technique, a matrix inversion computation can be performed by performing a set of general K×K matrix multiplications. It is noted that other iterative techniques for performing matrix inversion can be used in place of the Newton approximation as outlined above. Various equations prescribing such techniques would be understood by a worker skilled in the art, and their implementation is similar to that described herein.

In various embodiments, time-division multiplexing (TDM) can be used to perform multiple matrix multiplications and inversions substantially concurrently. Different matrix multiplication operations can be performed at different times, as resources become available. In some embodiments, where digital electronics are used, digital-to-analog converters (DAC) and analog-to-digital converters (ADC) can be utilized to transfer the data from the digital domain to the analog domain (corresponding to optical MAC operations) and vice-versa. In other embodiments, where analog electronics such as analog memory components are used, DACs and ADCs may not be necessary. For example, the analog data may be used as an input signal for driving (e.g. using an amplifier) tunable optical filters such as MRRs. After the matrices have been loaded to be multiplied, the MAC operations can be performed using a photonic computing block, which may be an optical chip. Loading the matrices can involve adjusting control signals to tunable optical filters (e.g. MRRs) of the photonic computing block, where the control signals may have magnitudes which are proportional to the matrix entries. Following a subsequent analog-to-digital conversion (if necessary), electronics hardware (e.g. digital or analog components) can be used to add and subtract matrices, and to store them temporarily. These steps can be repeated iteratively until the result of a matrix inversion operation is converged. Iteration refers to a repetition of a set of steps or operations, wherein the output of each (except the last) instance of the set of steps or operations is used as input into the immediately following instance of the set of steps or operations.

Figure 2:
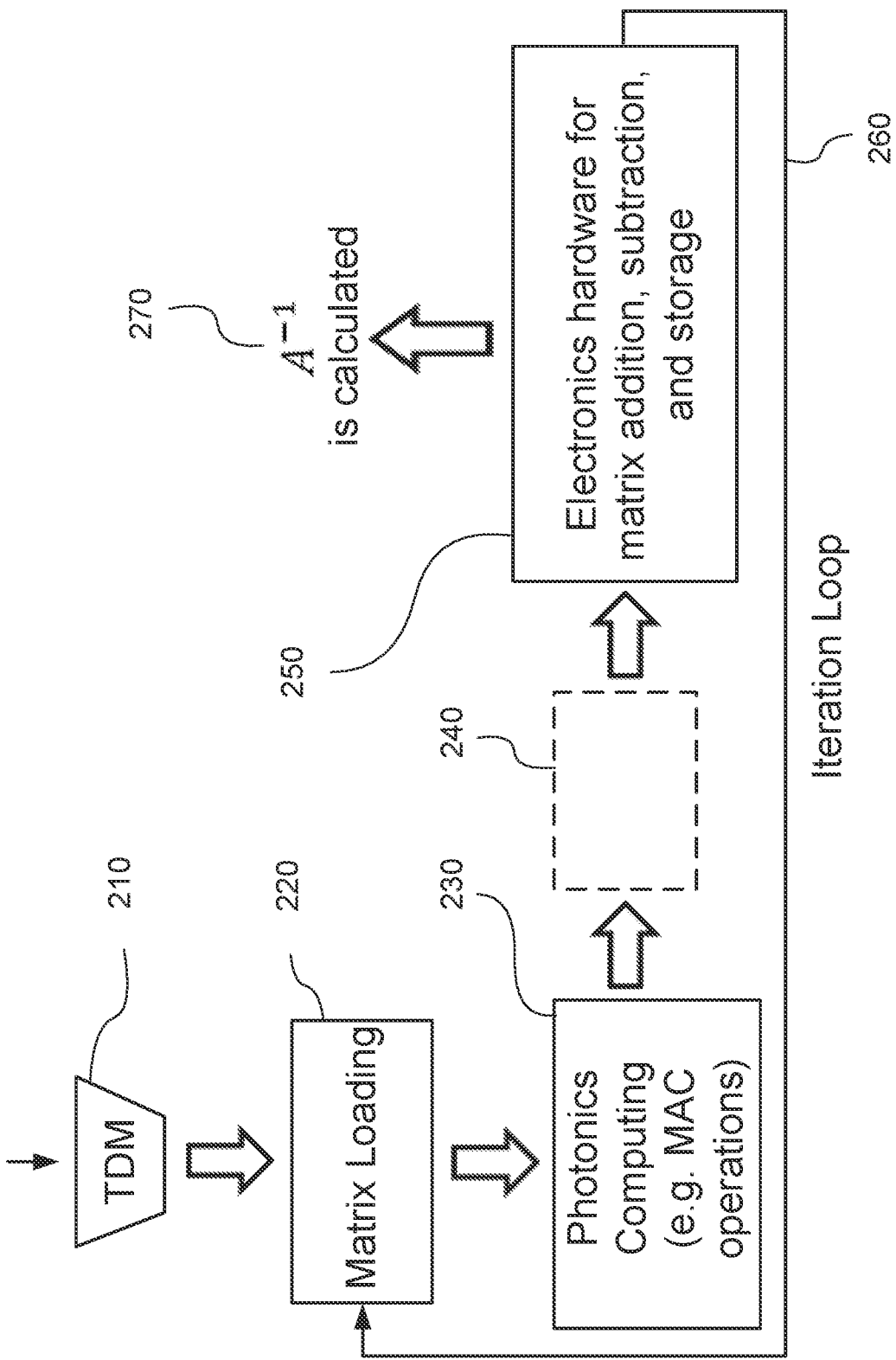
FIG. 2 illustrates a system for computing a matrix inverse, incorporating a photonic computing block, in accordance with an embodiment of the present invention.

FIG. 2 illustrates a block diagram of a photonics-based computing system for performing matrix inversions, according to an embodiment of the present invention. The components of FIG. 2 are used to process data that has already undergone preprocessing, for example to represent complex-valued and negative (left-hand) matrices in a format suitable for photonic processing, as described elsewhere herein. First, a TDM unit 210 may be used to perform matrix multiplications and inversions substantially uninterrupted in time, if required. The TDM unit receives matrix inversion tasks and schedules these tasks in time. The TDM provides matrix inversion tasks to the matrix loading functional block 220. Multiplication tasks can similarly be scheduled and loaded. The matrix loading functional block 220 receives data indicative of entries in a matrix to be multiplied, possibly along with related data such as the matrix size. The data also indicates the matrix position of each entry.

The matrix loading functional block provides analog values to a photonic computing block 230 where they are used to appropriately configure components such as MRRs, as will be described in more detail below. MAC operations can then be performed in the photonic computing block 230 by manipulation of optical signals. Following photonic computing, resultant optical signals are converted into (or represented using) electrical signals. An optical to electronic transducer (e.g. a photodetector) can be used for this purpose. Electronics hardware can receive the electrical signals and operate to perform further operations such as matrix addition, subtraction, and storage 250 operations. The steps can be repeated in an iteration loop 260 until the result of a matrix inversion operation is calculated 270.

In some embodiments with respect to FIG. 2, the electronics components consist essentially of digital electronics. In such cases, analog-to-digital converters, digital-to-analog converters, or both, can be provided between digital electronics components and photonics components, as required to facilitate interoperation. For example, the matrix loading block functional block 220 may include a DAC. In such an example, the matrix loading functional block converts the received digital data into analog values using a DAC or a plurality of DACs. As another example, the optional block 240 may include an ADC configured to convert (e.g. electrical) signals indicative of photonics outputs to digital format. The ADC 240 is shown as being optional, for example because it can be incorporated into the electronics hardware or provided in another form. However, an optical-to-electronic transducer and a device providing a digital output indicative of a strength of the optical signal is typically required when the electronics hardware is digital in nature.

In some embodiments with respect to FIG. 2, the electronics components consist essentially of analog electronics. In such embodiments, various preprocessing operations can be performed using analog circuitry and the results stored in analog format. In such embodiments, DAC and ADC circuits may not be necessary. However, if digital control or monitoring of the analog electronics is used, DAC and ADC circuits may potentially be used in the control or monitoring circuitry.

In some embodiments with respect to FIG. 2, the electronics components include a mixture of digital electronics and analog electronics. In this case, analog-to-digital converters, digital-to-analog converters, or both, can be provided between digital electronics components and analog electronics or photonics components, as needed to facilitate interoperation of different types of components.

As mentioned above, in a broadcast-and-weight architecture, different wavelength channels of light are weighted by separate MRRs, each of which serves as the multiplication part of a MAC operation. In order to employ that structure in matrix multiplication, the elements of a first, left-hand-side matrix in the multiplication are encoded as light intensities, and the elements of a second, right-hand-side matrix in the multiplication are applied as the weighing coefficients. Consequently, first, only real-valued matrices can be represented in this structure, and second, due to the fact that the elements of the first matrix are encoded to light intensities, only positive values of the first matrix can be represented. In order to fit any arbitrary matrix potentially having complex and negative values into this architecture, additional preprocessing operations may be performed, as described below. It is noted that matrices having complex and negative values include channel matrix (If), beamforming matrices, and other type of matrices typically computed in wireless communication applications in general and MIMO applications in particular.

In an embodiment of the present invention, a first preprocessing step can address complex-valued matrices. In order to represent complex-valued matrices in the proposed photonics-based computing platform, a real representation of a complex-valued matrix can be produced. A complex-valued matrix A can be represented as:

$$A = A_r + jA_i$$

where $A_r$ and $A_i$ denote the real and imaginary parts of A, respectively. The real representation of matrix A can be written as a larger matrix:

$$A \Rightarrow \begin{bmatrix} A_r & -A_i \\ A_i & A_r \end{bmatrix} \quad (4)$$

Hence, multiplication of two complex-valued matrices, namely A and B, can be performed by multiplying the real representations of those matrices, and then deriving the real and imaginary parts of the resulting matrix accordingly. The following equations represent this.

$$A \times B = (A_r + jA_i) \times (B_r + jB_i) \quad (5)$$

$$A \times B = (A_r \times B_r - A_i \times B_i) + j(A_r \times B_i + A_i \times B_r)$$

$$A \Rightarrow \begin{bmatrix} A_r & -A_i \\ A_i & A_r \end{bmatrix} \text{ and } B \Rightarrow \begin{bmatrix} B_r & -B_i \\ B_i & B_r \end{bmatrix} \quad (6)$$

$$A \times B = \begin{bmatrix} A_r & -A_i \\ A_i & A_r \end{bmatrix} \times \begin{bmatrix} B_r & -B_i \\ B_i & B_r \end{bmatrix}$$

$$A \times B = \begin{bmatrix} A_r \times B_r - A_i \times B_i & -A_r \times B_i - A_i \times B_r \\ A_r \times B_i + A_i \times B_r & A_r \times B_r - A_i \times B_i \end{bmatrix}$$

In that regard, in order to multiply two complex-valued matrices, four parallel real-valued matrix multiplications of the same size can be performed in the system to calculate the final complex-valued matrix. Once the parallel multiplications are performed, voltage adders can add signals of real and imaginary parts, respectively.

Accordingly, embodiments of the present invention include a preprocessing step in which two complex-valued matrices are converted into real representations in accordance with Equation (4). The real representation of a matrix A is a block matrix consisting of four blocks. The upper left block and the lower right block are equal to the real part of the matrix A. The lower left block is equal to the imaginary part of the matrix A. The upper right block is equal to the negative of the imaginary part of the matrix A. In order to multiply two complex-valued matrices A and B, processing by analog or digital electronics may be performed to compute the real representations of both matrices. Then, the real representations of matrices A and B can be provided to a photonics-based computing system (photonic computing block) which is configured to multiple the two real representations together. The results of the multiplication can be provided back to the digital domain and the results of the original multiplication A×B can be derived from the results.

Notably, comparing Equations (5) and (6), it can be seen that real part of A×B corresponds to the upper left block of the matrix in Equation (6), and the imaginary part of A×B corresponds to the lower left block of the matrix in Equation (6). Accordingly, in some embodiments, optical, electronic, or both optical and electronic operations corresponding to the computation of the upper right and lower right blocks of the matrix in Equation (6) can be omitted, because they provide redundant information. More generally, operations corresponding to one of the upper left and lower right block of the matrix in Equation (6) can be omitted, and operations corresponding to one of the lower left and upper right block of the matrix in Equation (6) can be omitted.

In an embodiment of the present invention, another preprocessing step can be performed to address negative-valued matrices. An approach, utilized herein, to support negative-valued left-hand-side matrices in such embodiments is to project the negative signs of the elements of the left-hand-side matrix, A, to the signs of the right-hand-side matrix, B. The left-hand side matrix A, with negative values integrated therein, is represented as a subtraction between two positive-valued matrices. Then the negative sign of the subtraction is projected into the signs of the second (right-hand-side) matrix elements. This is represented as follows:

$$A \times B = (\overline{A} - a_{min}\mathbf{1}) \times B$$

$$A \times B = \overline{A} \times B + a_{min}\mathbf{1} \times (-B) \quad (7).$$

Here, $\overline{A} = A + a_{min}\mathbf{1}$ and $a_{min}$ is the absolute value of the entry in A with the minimum (most negative) value. It is considered that adding an absolute value of a most negative entry is equivalent to subtracting the most negative entry, when that entry is indeed negative. In the above, the numeral "1" represents a matrix with each entry set to one. For instance, if matrix A has negative elements, namely, $-a_{12}$ and $-a_{22}$, where $-a_{22}$ is the element with the minimum value, matrix multiplication of matrix A and matrix B can be written as:

$$A \times B = \begin{bmatrix} a_{11} & -a_{12} \\ a_{21} & -a_{22} \end{bmatrix} \times \begin{bmatrix} b_{11} & -b_{12} \\ b_{21} & b_{22} \end{bmatrix}$$

$$A \times B = \left( \begin{bmatrix} a_{11} + a_{22} & -a_{12} + a_{22} \\ a_{21} + a_{22} & 0 \end{bmatrix} - \begin{bmatrix} a_{22} & a_{22} \\ a_{22} & a_{22} \end{bmatrix} \right) \times \begin{bmatrix} b_{11} & -b_{12} \\ b_{21} & b_{22} \end{bmatrix}$$

$$A \times B = \begin{bmatrix} a_{11} + a_{22} & -a_{12} + a_{22} \\ a_{21} + a_{22} & 0 \end{bmatrix} \times \begin{bmatrix} b_{11} & -b_{12} \\ b_{21} & b_{22} \end{bmatrix} + \begin{bmatrix} a_{22} & a_{22} \\ a_{22} & a_{22} \end{bmatrix} \times \begin{bmatrix} -b_{11} & b_{12} \\ -b_{21} & -b_{22} \end{bmatrix}$$

(In the above example calculation, all values of $a_{ij}$ and $b_{ij}$ are positive, with negative signs used to show negative values explicitly.)

Hence, negative-valued matrix multiplication is performed by summation of two matrix multiplications both involving left matrices which are positive-valued, which can be processed in parallel in the proposed photonics-based computing architecture.

Accordingly, embodiments of the present invention include a preprocessing step in which a multiplication operation applied to two matrices is converted into a sum of a first multiplication operation and a second multiplication operation, in accordance with Equation (7). The left matrix in each of the first and second multiplication operations includes only non-negative values. The left matrix in the first multiplication is produced by adding, to each entry in the original left matrix, the absolute value of the entry in that matrix with the minimum value. The left matrix in the second multiplication is set equal to a matrix in which each entry is equal to the absolute value of the entry in the original left matrix with the minimum value. The right matrix in the second multiplication is set equal to the negative of the right matrix in the original multiplication. In order to multiply two matrices A and B, processing by analog or digital electronics may be performed to compute the matrices for the first and second multiplications, as described above. Then, the computed for the first and second multiplications are provided to a photonics-based computing system which is configured to perform the multiplications. The results of the first and second multiplications can be provided to the electronics and added together in the electronics domain.

It is noted that, because the second multiplication in Equation (7) involves a left matrix having all its entries being identical, a simplified photonic computing block can potentially be employed to perform this second multiplication. In such a simplified block, because all the elements of the first, left-hand-side matrix are equal, multiple MRRs can be set to the same value, for example using a single common control element such as a single DAC. This reduces the number of DACs and also reduces corresponding power consumption, circuit cost and complexity. Moreover, according to the runtime and feasible parallelization, an architecture with only one optical channel can be exploited multiple times to perform the second matrix multiplication. However, according to embodiments of the present invention, the same general-purpose photonic computing block is used for all matrix multiplications. This has the advantage of not requiring multiple specialized circuits.

In an embodiment of the present invention, a third preprocessing step can be performed in order to address the limitations on the number of wavelengths and the number of MRRs that can be used at once by a single photonic computing block. According to this third preprocessing step, large matrices can be partitioned into multiple smaller matrices through tiling, and the smaller matrices can be subject to separate multiplication operations using the photonic computing block. The results of the separate multiplication operations can then be combined together using electronics to produce the final result of the (large) matrix multiplication. Parallelization and matrix tiling methods can be used so that multiplication of matrices with arbitrary size can be supported by an optical computing platform having limited dimensions. This may facilitate optical computing in a massive MIMO system, in which the sizes of the matrices scale by the number of base station (BS) antennas and the number of mobile devices (users) K. To do so, the matrices can be partitioned based on the number of available parallel channels D and the number of MRRs 2R of the photonic computing block. The results of partial multiplications are recorded in memory and in the last step, corresponding parts are added together to obtain the final result. There are 2R MRRs per channel because R MRRs are provided for optically implementing the first matrix and R additional MRRs are provided for optically implementing the second matrix.

Figure 3:
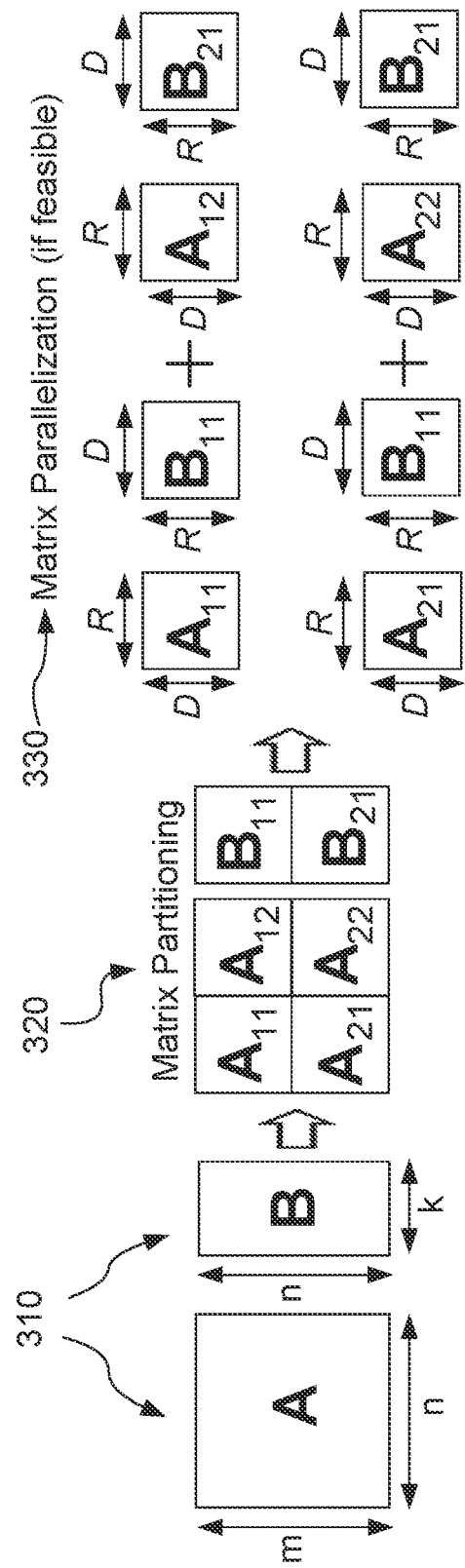
FIG. 3 illustrates operations supporting the multiplication of two matrices using a photonic computing block, using partitioning and parallelization, in accordance with an embodiment of the present invention.

FIG. 3 illustrates how matrices A and B can be multiplied using a photonic computing block with D parallel channels and 2R MRRs. First, a matrix A having m rows and n columns, and a matrix B having n rows and k columns 310, are partitioned ("tiled") into plural matrices 320 each having at most D rows and R columns. Here, D is the number of optical channels of the photonic computing block, and 2R is the number of MRRs (or other devices) per channel of the photonic computing block. For example, the photonic computing block may have D=4 channels and 2R=128 MRRs. If feasible, partitioning can be followed by matrix parallelization 330. According to matrix parallelization, multiple ones of the partitioned matrices 320 are processed concurrently and in parallel by multiple photonic computing blocks so that the results can be more rapidly reassembled into a non-partitioned matrix. To support this, multiple photonic computing blocks may be provided and operated, and the associated electronics may be configured to allocate different matrix multiplication tasks to different photonic computing blocks and collect and process the results. The value of D is referred to as a row threshold, and the value R is referred to as a column threshold. These thresholds are upper limits on the numbers of rows and columns, respectively, of matrices which can be accepted and handled by the photonic computing block. In other words, the row threshold and the column threshold are upper limits which are dictated by the physical hardware limitations of the photonic computing block. Preprocessing via partitioning is therefore performed in order to produce break large matrices into smaller representative matrices which can be handled by the photonics computing block.

As will be readily understood by a worker skilled in the art, multiplication of two large matrices can be performed by partitioning the matrices into smaller submatrices, performing a set of multiplications on the submatrices, and processing the results of the multiplications to derive the result of the original multiplication (of the large matrices). The processing of results involves additions rather than matrix multiplications, and hence can be performed by the electronics. The processing can include performing addition operations, each of which includes adding together results of submatrix multiplications.

In an embodiment of the present invention, matrix preprocessing to accommodate a photonic computing block of limited size and capability can be seen as the first of a sequence of steps for performing matrix multiplication. One, some or all of the preprocessing steps to address complex-valued matrices, negative-valued matrices, and large matrices, each as described above, can be performed. The preprocessing steps can be applied unconditionally or on an as-needed basis. In some embodiments, tests can be performed on matrix inputs to determine which preprocessing steps are required, and only the required preprocessing steps are then implemented. For example, matrices can be checked for complex values, left-hand matrices can be checked for negative values, or matrices can be checked for size. When a certain application handles matrices of a consistent size, checking for size on a per-matrix basis can be omitted. Instead, parallelization can be implemented globally if needed, or omitted if not needed. An apparatus provided according to embodiments of the present invention can be capable of performing one, some or all of these preprocessing steps.

Figure 4:
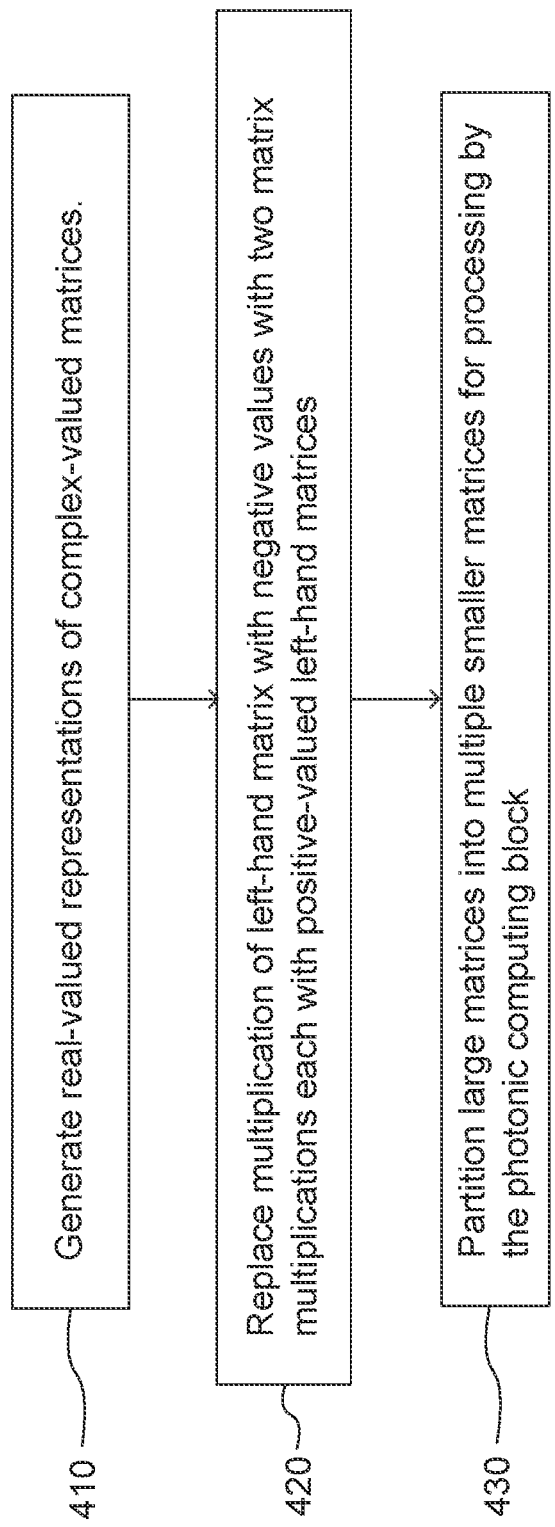
FIG. 4 is a flow chart indicating preprocessing steps to prepare input data for a matrix multiplication operation to be implemented on a photonic computing block, in accordance with an embodiment of the present invention.

FIG. 4 illustrates preprocessing steps to prepare matrix data for a photonic computing block matrix multiplication operation, according to an embodiment of the present invention. First, if a matrix contains complex-valued entries, a real-valued representation of that matrix and the matrix which it is multiplied with are produced 410. The determination is as described above for example with respect to Equation (4). Second, if the left-hand matrix in a matrix multiplication contains negative elements, the multiplication is replaced 420 with the multiplication of two revised matrices, as described above for example with respect to Equation (7). The results of the two multiplications are subtracted, by the electronics, to obtain the final result of the multiplication. Third, matrices involved in the multiplication can be partitioned 430 into multiple smaller matrices, each having a number of rows and columns which are capable of being processed by the available photonic computing block circuitry.

In some embodiments, the operations 410, 420, 430 are performed in the illustrated order. In other embodiments, the operations 410, 420, 430 are re-ordered. For example, if the partitioning 430 is performed first, then the operations 410, 420 may be applied to all multiplications of submatrices for simplicity, or else the operations 410, 420 may be applied to only those multiplications of submatrices where it is required. That is, in some embodiments, step 410 is omitted for multiplications of submatrices in which both submatrices are real, step 420 is omitted for multiplications of submatrices in which the left matrix has only positive elements. In some embodiments, the partitioning 430, when performed first, can be performed in such a manner that, where possible, real-valued submatrices, non-negative submatrices (in the left side of the multiplication), or both, are produced. This may involve re-ordering rows and columns of matrices.

Accordingly, in general, embodiments of the present invention provide for preprocessing of one or both of a pair of matrices to be multiplied. The preprocessing produces one or more representative pairs of matrices for subsequent multiplication, as described above. The preprocessing is carried out, where necessary, so that each of the representative pairs of matrices consists of real values, for example by conversion of matrices into real representations thereof. The preprocessing is carried out, where necessary, so that each of the representative pairs of matrices has a number of rows less than or equal to a row threshold, and has a number of columns less than or equal to a column threshold, for example by partitioning. Furthermore, the preprocessing is carried out, where necessary, so that a left-hand matrix of each of the representative pairs of matrices consists of non-negative values, for example by a subtraction operation as described with respect to Equation (7). Real values refer to the real (non-imaginary) part of a complex number, while imaginary values refer to the imaginary (non-real) part of the complex number. For example, for a complex number of the form a+ib, where i represents the square root of negative one, the real value is a and the imaginary value is b.

Generating representative pairs of matrices involves receiving electrical signals indicative of the pair of matrices to be represented, and outputting, based on these received electrical signals, further electrical signals indicative of the representative pairs of matrices. Electrical signals can be formatted to represent matrices in a variety of ways, for example a set of electrical signals can be produced, each of which as a digital or analog value level which corresponds to the mathematical value of one entry in one matrix. Electrical signals may be stored in digital or analog memory.

Figure 5A:
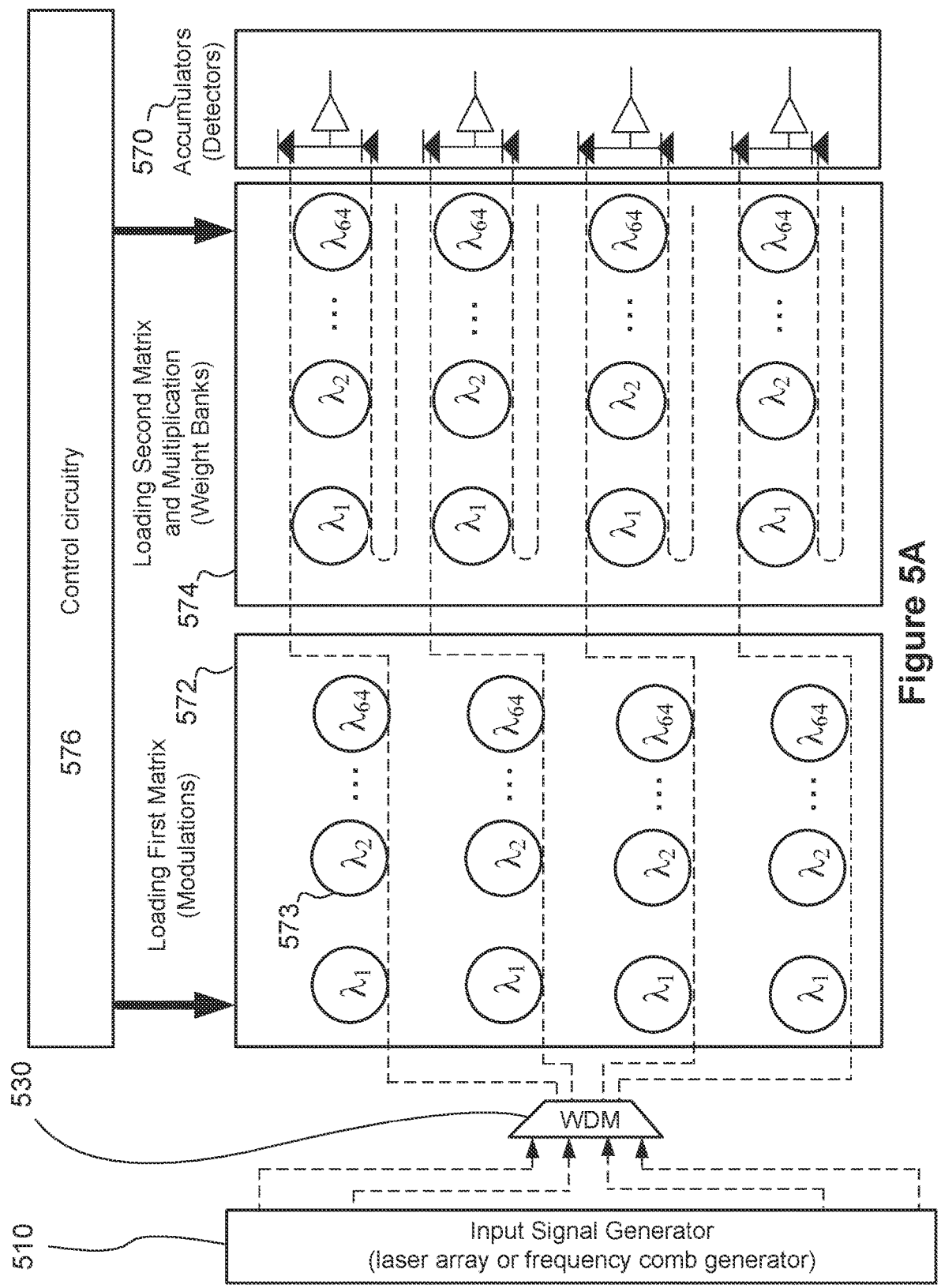
FIG. 5A illustrates a photonic computing block provided in accordance with an embodiment of the present invention.
Figure 5B:
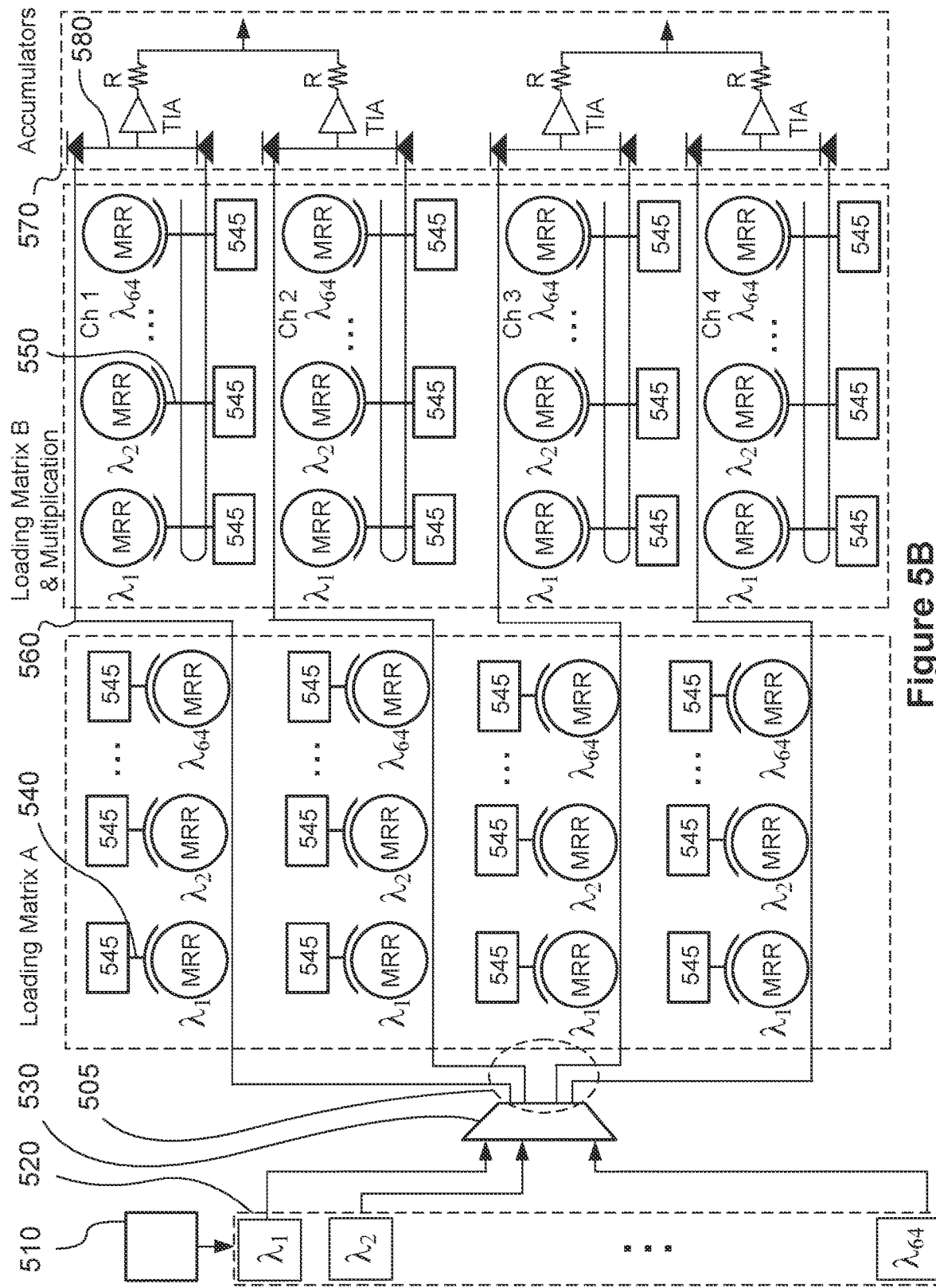
FIG. 5B illustrates a particular example of the photonic computing block of FIG. 5A, in accordance with an embodiment of the present invention.

In an embodiment of the present invention, a photonic computing block can have four parallel channels, process light of 64 different wavelengths, and have 128 DACs and 128 MRRs per channel. Other numbers of wavelengths, and corresponding numbers of DACs and MRRs (or other optical filters) can also be provided for. An example of such an embodiment is illustrated in FIGS. 5A and 5B. Such a photonic computing block can be capable of processing multiplications of complex-valued matrices with at most x rows and y columns. Each of the four channels can be used concurrently to process a corresponding one of four multiplications as shown in Equation (6). The four multiplications correspond to the multiplications in the two left blocks (or equivalently in the two right blocks) appearing in Equation (6). That is, the four multiplications are $A_r \times B_r$, $A_i \times B_i$, $A_r \times B_i$ and $A_i \times B_r$. The results of the four multiplications can be combined using addition or subtraction, as appropriate, to obtain all the block entries in Equation (6). The addition or subtraction can be performed in the photonic computing block. For example, as illustrated in the accumulator section of FIG. 5B, the outputs of pairs of TIAs are connected together. The connection between the top two TIAs implements the subtraction operation $A_r \times B_r - A_i \times B_i$ as shown in Equation (6). The connection between the bottom two TIAs implements the addition operation $A_r \times B_i + A_i \times B_r$ as shown in Equation (6). Accordingly, each of the four channels illustrated in FIGS. 5A and 5B can be used concurrently to process each of the four multiplications required to implement the block multiplications of Equation (6).

Embodiments of the present invention therefore comprise using a photonic computing block to perform the four multiplications above, and then combining results of the four multiplications to produce a result indicative of multiplication of two original matrices, at least one of which is complex. The four multiplications correspond to separate multiplications of real and imaginary parts of the two original matrices.

FIG. 5A illustrates a general block diagram for a photonic computing block, according to an embodiment of the present invention. FIG. 5A includes an optical signal source (also referred to as an input signal generator) 510 which produces a plurality of narrowband component optical signals at a plurality of different frequencies (and wavelengths). A WDM 530 receives light from the input signal generator.

A first modulation block (also referred to as a first optical signal processing section) 572 processes light received from the input signal generator via the WDM, in accordance with values representative of a first matrix of a multiplication. The first modulation block modulates each of the plurality of narrowband component signals using a first plurality of optical modulators. Each of the first plurality of optical modulators may be electronically controlled to modulate one of the narrowband component signals by an amount proportional to a corresponding positive entry in a left-hand one of the representative pairs of matrices. This can be performed by encoding this positive entry as a light intensity into said one of the narrowband component signals. Modulating an optical signal by an amount which is proportional to a matrix entry may include adjusting an amplitude of the optical signal by an amount or factor which is proportional to the matrix entry.

A second modulation block (also referred to as a second optical signal processing section) 574 processes light from the input signal generator in accordance with values representative of a second matrix of a multiplication. The second modulation block modulates each of the plurality of narrowband component signals using a second plurality of optical modulators. Each of the second plurality of optical modulators is electronically controlled to modulate one of the narrowband component signals by another amount proportional to a corresponding positive or negative entry in a right-hand one of the representative pairs of matrices. This can be performed by applying the positive or negative entry as a weight to a corresponding one of the narrowband signals.

An accumulator section 570 receives the processed light, and accumulates the results using an amplifier in order to produce a signal indicative of a part of a matrix multiplication. The accumulator processes the optical signal following modulation by the first modulation block and the second modulation block. This processing includes accumulating a total power of light of the narrowband component signals. For example, the accumulator can receive light having multiple, separate spectral components each having a certain power of light. The accumulator can then output a signal equal to the sum of the power of light in each of these multiple spectral components. An accumulator can include, for example, a photodetector, such as a photodiode, responsive to a sufficiently wide optical bandwidth and having a sufficiently equal response to all input light within said optical bandwidth. This total power of light corresponds to an entry in a product of multiplying the representative pair of matrices. Accordingly, a broadcast-and-weight matrix multiplication operation is performed.

Control circuitry 576 is used to load values representing entries of the first matrix and the second matrix into the tunable optical filters to facilitate the broadcast-and-weight multiplication. Output of the accumulators 570 may be provided back to electronic circuitry for further processing.

In more detail, tunable optical filters 573 are used in the first optical signal processing section 572 and the second optical signal processing section 574 to process optical signals in a manner that implements the matrix multiplication. Four channels, each associated with 128 different tunable optical filters are shown, although these numbers can be varied. The tunable optical filters of the first optical signal processing section 572 may be capable of representing positive values only, whereas the tunable optical filters of the second optical signal processing section 574 may be capable of representing both positive and negative values. Further details of the optical signal processing block will become clearer with respect to FIG. 5B, which shows a particular example of the optical signal processing block of FIG. 5A.

In alternative embodiment, MRRs used for implementing the first matrix in the first optical signal processing section 572 may be add-drop MRRs which are capable of implementing negative matrix values. In such embodiments, preprocessing operations to force the first matrix to have positive values only may not be necessary.

In the embodiment of FIG. 5B, a frequency comb generator 510 (for example operatively coupled to a light source) creates light of 64 different wavelengths 520 in the system. Alternatively, another means, such as multiple narrowband light sources, can be used to produce light of multiple (e.g. 64) different wavelengths. The WDM 530 multiplexes light of the 64 different wavelengths onto the four different optical channels 505, such that each of the four optical channels carries light of all 64 different wavelengths. Concurrently, the elements of a matrix A are encoded in the intensities of the wavelength-multiplexed signals 540 and the elements of a matrix B are encoded as weighing coefficients 550. Optical tunable optical filters, in this example taking the form of MRRs, operatively coupled to control elements 545 such as DACs, are used to encode the elements of the matrices in the intensities of the signals 540 and weighting coefficients 550. The control elements can be operatively coupled to control circuitry, which may include electronics configured to set the control elements to provide a desired signal (e.g. analog voltage or current signal) to the MRRs in order to configure the MRRs.

Matrix A corresponds to the left-hand matrix in a matrix multiplication and matrix B corresponds to the right-hand matrix in the matrix multiplication. Elements of matrix A are linked to elements of matrix B via an optical waveguide 560. Once the multiplications of signals and weights are performed, an accumulator 570 operates to detect the total power of all wavelength channels (i.e. the total power of all narrowband component signals being modulated). To facilitate representing positive and negative weights in analog photonics, the accumulator 570 at the output of the drop and through ports incorporates a balanced photodiode with a transimpedance amplifier (TIA) 580, which provides electronic gain.

The building blocks of the broadcast-and-weight architecture in the currently described embodiment include microring resonators (MRRs) (or similar electronically tunable optical filters) that can be categorized into two different types: single-bus MRRs and add-drop MRRs. The single-bus MRRs each have a single output port containing the affected transmission signal. The add-drop MRRs have two output ports, referred to as the through port and the drop port, respectively. According to the architecture of the MRRs, single-bus MRRs can only be used to represent positive matrix entries in the present invention, while the add-drop MRRs are able to represent both positive and negative matrix entries.

According to FIG. 5B, pairs of amplifiers (e.g. transimpedance amplifiers or TIAs) in the accumulator section 570 are connected together at their outputs. The TIAs can be connected together via direct connection or switches in order to implement the addition or subtraction of matrix multiplications for example in order to implement addition or subtraction operations directly. Alternatively, as shown in FIG. 5A, the channel outputs can be provided separately to electronic circuitry which may implement addition or subtraction operations where necessary, although such operations might not be implemented depending on the current calculations being performed.

The embodiments of FIGS. 5A and 5B, having four channels, one out of two blocks being capable of handling negative values, and a limited size, is appropriate for operation with the preprocessing steps 410, 420, 430 of FIG. 4. The preprocessing steps of FIG. 4, in combination with the photonic computing block of FIGS. 5A and 5B, facilitate the multiplication of matrices having both complex and negative values, via a combination of digital manipulation of data and photonic manipulation of waveforms carrying data.

Figure 6:
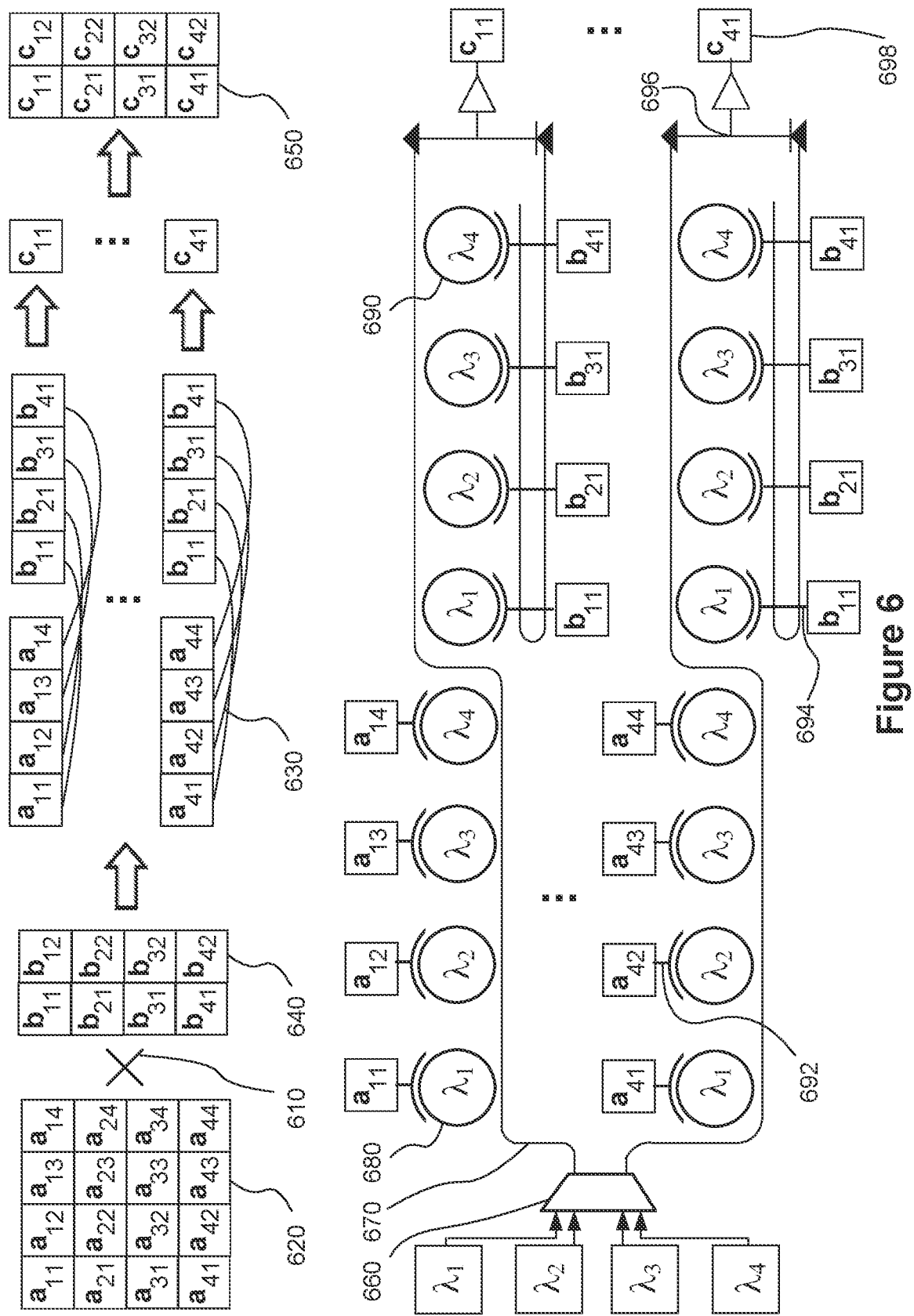
FIG. 6 illustrates details of a multiplication of two pre-processed matrices implemented using a photonic computing block, in accordance with an embodiment of the present invention.

FIG. 6 illustrates an example embodiment of the present invention where a multiplication 610 of two matrices is implemented using a photonic computing block. Each element of the first row of a matrix A 620 having elements $a_{11}$ to $a_{44}$, is multiplied 610 with the elements of a matrix B 640 having elements $b_{11}$ to $b_{42}$, which results in a matrix C 650. Aspects 630 of the element-by-element multiplication of the matrix A by the elements in the first column of matrix B are shown by way of example. As will be readily understood, the multiplication corresponds to computing, for each index i and k corresponding to the matrix sizes, the entries of the product matrix C, where the entries are given as $c_{ik} = \sum_{j=1}^{4} a_{ij} b_{jk}$. FIG. 6 illustrates a first multiplication of the first row of the matrix A with the first column of the matrix B, and a second multiplication of the fourth row of A with the first column of B in detail. Multiplications of other rows and columns are performed similarly. The first and second multiplications are shown using two different channels of the photonic computing block, although the multiplications can alternatively be performed serially using the same channel of the photonic computing block.

In the photonic computing block, a first optical signal is produced by combining plural narrowband component signals having wavelengths $\lambda_1$, $\lambda_2$, $\lambda_3$, $\lambda_4$, respectively. The combination is performed using a WDM 660 which also provides multiple copies of the first optical signal to different parallel channels. Regarding the first channel, the first optical signal travels through an optical waveguide 670. The signal passes, and is affected by, a series of all-pass MRRs 680 and then a series of add-drop MRRs 690. Each element of a row of left-hand matrix A of a multiplication is encoded as an intensity level and loaded 692 on a corresponding all-pass MRR. This process involves using a DAC to produce an analog signal output which is proportional to a corresponding matrix entry. The analog signal output is used to drive the corresponding MRR. Similarly, each element of a column of matrix B is encoded as an intensity level and loaded 694 on a corresponding add-drop MRR. A multiplication between two matrix elements (e.g. $a_{11}$ and $b_{11}$) is performed when a component signal, carried in the first optical component signal of a given wavelength, is intensity-encoded signal by an all-pass MRR, and then subsequently intensity-encoded by an add-drop MRR, where the all-pass MRR and the add-drop MRR are both tuned to apply the proper weight. The component signals are all processed by the respective MRRs so that their intensities represent a corresponding multiplication between two matrix elements. The intensities of all the component signals are summed together using a balanced photodetector 696 (e.g. a photodiode). The output of the photodetector is an electronic signal which is proportional to and represents the sum of the multiplications between matrix elements. Therefore, the output of the balanced photodetector 696 represents one of the corresponding elements 698 of matrix C, which is the product of matrices A and B.

In more detail, the input (original) signal is transferred into the MRR via a directional coupler and then, from the output ports of the MRR, recombined. The electronic signal applied to the MRRs, which represent the elements of each of the first and second matrices, controls the effective index of refraction between the waveguide and the MRR. Hence, the optical signal exiting of the MRRs is affected (via a phase shift) accordingly. Accordingly, that effect on the transmission signal is the realization of each of the elements of the matrices involved in matrix multiplication.

Figure 7:
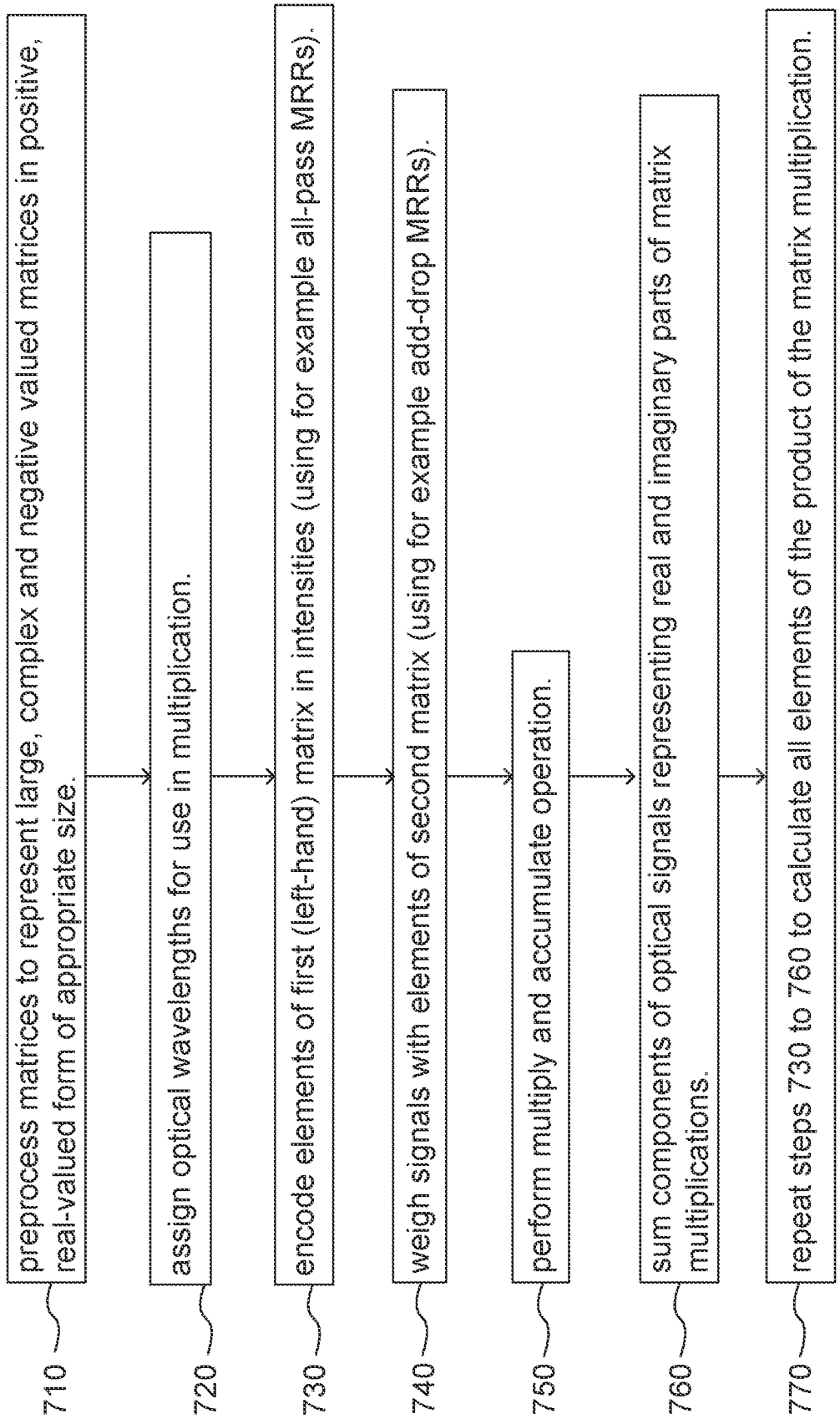
FIG. 7 is a flow chart indicating steps for implementing a matrix multiplication using a photonic computing block, in accordance with an embodiment of the present invention.

FIG. 7 illustrates a sequence of operations to perform matrix multiplication, according to an embodiment of the present invention, using the photonic computing block of FIG. 5A. First, preprocessing 710 is performed as needed to represent large, complex- and negative-valued matrices in a positive, real-valued format of appropriate size. The preprocessing can involve block partitioning, addition, subtraction, etc. Second, optical wavelengths are assigned 720 for use in the multiplication. Different optical wavelengths are assigned for manipulation, by a corresponding pair of MRRs, so that the intensity of an optical signal component at a given optical wavelength, following manipulation, represents the multiplication of a pair of matrix entries. The wavelengths are produced for example using a frequency comb generator, laser bar, or other device providing multiple narrowband optical signals of different wavelengths. Third, elements (entries) of the first matrix are encoded 730 in intensities, and in some embodiments, this can be done using MRRs (e.g. all-pass MRRs or add-drop MRRs). Fourth, signals are weighted 740 with elements of the second matrix, and in some embodiments this can be done using add-drop MRRs. Fifth, a multiply and accumulate operation 750 is performed by processing the optical signal components using the MRRs as set in steps 730 and 740. This corresponds to multiplication of one or more rows of the first matrix with one or more columns of the second matrix. Optical signals are first processed by the programmed all-pass MRRs and then by the corresponding programmed add-drop MRRs. Each optical signal includes multiple optical signal components which are processed to reflect the multiplication of two matrix component entries. Each optical signal is transmitted via an optical waveguide. Sixth, components of the optical signals representing real and imaginary parts of the matrix multiplications are summed 760 for example using voltage adders or alternatively using digital processing operations. The real and imaginary parts can be added separately. Seventh, steps 730 to 760 are repeated 770 to calculate all matrix elements in the product of the matrix multiplication.

In more detail, following matrix multiplication operations performed by the photonic computing block, electronics, such as digital electronics, analog electronics, or a combination thereof, receive and process the output of the photonic computing block. This output corresponds to signals indicative of one or more representative product matrices. Representative product matrices refer to matrices which are the product of multiplication of corresponding representative matrices to be multiplied together. The electronics processing is performed to produce a product of the multiplication of the original pair of matrices to be multiplied together. This can be referred to as post-processing. The post-processing can include, for example, generating complex-valued matrices from real representations, adding results of several matrix multiplications together, combining results of separate multiplications that were previously partitioned, or the like, or a combination thereof. The post-processing can be performed in order to produce final results of matrix multiplications for example in accordance with Equations (6) and (7). The post-processing can be performed in order to combine multiple product matrices which were produced by multiplying representative matrices that were partitioned into smaller matrices, for example by adding multiple product matrices together in a predetermined manner, and then constructing a larger product matrix from the results of such additions in a blockwise manner.

In an example embodiment, based on readily available silicon photonics foundries, components of the photonics architecture as shown in FIG. 5A can be implemented with an areal density of approximately 104 MRR/mm$^2$, which corresponds to a compute density of around 5 [TMAC/s]/mm$^2$ for multiplication of vectors with complex values. For the required computation speed of 440 TMAC/s, 880,000 MRRs or approximately 1 cm 2 of chip area are needed. This small area is the size of a standard semiconductor chip die. In addition to the silicon photonic integrated circuit, the computation system must also include laser sources, electrical and optical inputs and outputs (I/O's), and an electronic circuit that controls all the weights.

Embodiments of the present invention can potentially offer significant improvements over computing units based solely on digital electronics used for processing signals in wireless communication systems. Photonics-based computing systems according to embodiments of the present invention can deliver much higher bandwidth compared to digital electronics chips while at the same time can offering better energy efficiency. These improvements come from the fact that optical signals have a spectral bandwidth of around 5 THz, which can provide an information capacity of 5 Tb/s for every spatial mode and polarization. On the other hand, communication or computations in the optical domain could be performed with minimal or theoretically even zero energy consumption—especially for linear or unitary operations.

Embodiments of the present invention can potentially offer lower latency compared to prior art devices. Photonic devices do not have the problem of data movement and clock distribution time along metal wires, and only a small number of photonic devices are required to perform a MAC operation, which greatly reduces the latency.

Compared to all-optical networks, embodiments of the present invention can also offer an advantage that it is based on amplitude and does not require phase information. Hence, the problem of phase noise accumulation in prior art is eliminated. Moreover, because the Broadcast-and-Weight protocol is not limited to a single wavelength, the overall capacity of the system is greater.

In comparison to neuromorphic-electronics chips, embodiments of the present invention can potentially operate six to eight orders of magnitude faster. This has become possible with the rapidly-changing manufacturability of photonic chips and in particular, with the emergence of hybrid platforms that can combine active and passive elements in the same chip.

Photonic MAC systems in accordance with embodiments of the present invention can potentially offer significant potential improvements over digital electronics in energy ($>10^2$), speed ($>10^3$), and compute density ($>10^2$). Embodiments of the present invention can practically achieve an energy efficiency of 2.7 fJ/MAC and a compute density of [50 TMAC/s]/mm$^2$; and to perform a single matrix multiplication with a vector size of the order of 100, a time interval of <100 ps can suffice. These figures of merit are orders of magnitude better than the performance achievable with digital electronics (i.e., GPU and TPU). Based on current silicon photonics technology, the computational unit required for next-generation wireless communications can theoretically be as small as a single chip of 1 cm 2 on a controller board, compared to towers of boards that would be required in case of GPUs or TPUs.

In embodiments of the present invention, the number of wavelengths and the number of MRRs in each channel, which is matched to the number of wavelengths, can be an arbitrary number. Higher numbers of wavelengths can enable higher computation rates. A greater number however, can come at the expense of the control circuitry and photonic chip being more complex. A limit to the number of wavelengths and MRRs on a single chip can be defined based on practical and theoretical considerations.

Embodiments of the present invention can be implemented with a substantially arbitrary number of channels in the photonic computing block. By increasing the number of channels, the number of MRRs also increases. Because increasing the number of channels increases the number of parallel multiplications possible, the computation rate can also be increased. However, in embodiments where the number of channels is greater, the control circuitry and the photonic chip can become more complex. The number of channels in the system can be defined based on the required computation rate and the feasibility of designing the control circuitry.

According to various embodiments, MRRs are used to process optical signal components in order to perform multiplication operations. The MRRs are an example of an optical modulator, and in general any suitable optical modulator can be used. Another example of an optical modulator is a Mach-Zehnder interferometer (MZI)-based optical modulator.

In further embodiments of the present invention, matrix inversion can be performed using techniques other than a polynomial expansion.

In an embodiment of the present invention, the third order Neumann series expansion can be used to perform a matrix inversion. The Neumann series expansion of the inverse of a matrix A is given by:

$$A^{-1} = \sum_{n=0}^{\infty} = (D^{-1}(D-A)^n)D^{-1}$$

which holds if:

$$\lim_{n \to \infty} (I - D^{-1}A)^n = 0$$

where D holds the diagonal elements of A. In MIMO detection, the inverse of the Gram matrix, ($H^H H$), which is a diagonally-dominant matrix, is required. Hence, a Neumann series expansion can lead to an acceptable approximation of the inverse of Gram matrix.

In an embodiment of the present invention, the Cholesky factorization technique can be used to perform a matrix inversion. In a Cholesky factorization, a positive definite matrix is decomposed into the product of a lower-triangular matrix and its conjugate transpose. The structure of triangular matrices resulting from a Cholesky factorization can be exploited to transform a matrix inversion to a set of linear matrix (vector) calculations, which can be implemented by using a photonic computing block approach according to embodiments of the present invention. An advantage of Cholesky factorization is that it can result in an exact matrix inversion.

In an embodiment of the present invention, preparation of a negative-valued matrix for a photonic computing block having a broadcast-and-weight architecture can be done with an approach other than projecting the negative signs of the elements of the left-hand-side matrix, A, to the signs of the right-hand-side matrix, B. In this embodiment, for each vector-by-vector multiplication in each parallel channel, which corresponds to multiplying a row of the left-hand-side matrix to a column of the right-hand-side matrix, the negative signs of the left-hand-side matrix elements are directly projected to the corresponding elements of the right-hand-side matrix at run-time. Considering matrices A and B as defined below, the elements of matrix C can be calculated as follows:

$$C = A \times B$$

$$\begin{bmatrix} c_{11} & c_{12} \\ c_{21} & c_{22} \end{bmatrix} = \begin{bmatrix} a_{11} & -a_{12} \\ a_{21} & -a_{22} \end{bmatrix} \times \begin{bmatrix} b_{11} & -b_{12} \\ b_{21} & b_{22} \end{bmatrix}$$

$$c_{11} = a_{11} \times b_{11} + (-a_{12}) \times b_{21}$$

$$c_{11} = a_{11} \times b_{11} + a_{12} \times (-b_{21})$$

$$c_{12} = a_{11} \times (-b_{12}) + (-a_{12}) \times b_{22}$$

$$c_{12} = a_{11} \times (-b_{12}) + a_{12} \times (-b_{22})$$

$$c_{21} = a_{21} \times b_{11} + (-a_{22}) \times b_{21}$$

$$c_{21} = a_{21} \times b_{11} + a_{22} \times (-b_{21})$$

$$c_{22} = a_{21} \times (-b_{12}) + (-a_{22}) \times b_{22}$$

$$c_{22} = a_{21} \times (-b_{12}) + a_{22} \times (-b_{22})$$

To calculate each element of the output matrix using this approach, the weights applied to the MRRs may be updated according to the sign of the corresponding elements in the left-hand-side matrix. Hence, the rate of weight changes in the system can be higher than with the first approach. However, this embodiment requires less matrix multiplications than the other embodiment addressing negative-valued matrices.

Embodiments of the present invention involve a combined operation of electronics and a photonic computing block, or multiple photonic computing blocks operating in parallel. The interface between the electronics and the photonic computing block can include DACs and ADCs. The electronics can include various digital devices such as microprocessors, computer processors operatively coupled to memory and executing instructions stored in said memory, ASICs, FPGAs, GPUs, TPUs, or the like, or a combination thereof. The electronics are configured to perform operations such as matrix additions, matrix preprocessing operations, providing output to DACs, and receiving and processing inputs from ADCs. To this end, matrix entries can be represented as digital data using one of a variety of formats, such as arrays of binary data stored in memory, or arrays of circuitry configured to process matrix data, or circuits configured to process data using multiplexing, or the like. A matrix can be represented as a plurality of data values, each value indexed to denote a corresponding row and column position in a matrix. Embodiments of the present invention may be adapted to handle other types of data, such as tensors or multidimensional arrays of data. Further, it is considered that embodiments of the present invention can be used to multiply vectors, which are considered to be matrices with a single row or column.

Additionally or alternatively to digital electronics, electronics of the present invention can include analog electronics. Analog electronics can include, for example, analog memory components and analog circuits which are configured to process signals indicative of data in the analog domain. For example, an addition operation can be performed by analog electronics by combining signals each indicative of a respective value (e.g. using superposition) to produce a resultant signal indicative of the sum of the respective values. Analog electronics, such as amplifiers or voltage or current circuits, can be configured to drive a tunable optical filter such as an MRR by outputting a signal that adjusts operation of the tunable optical filter. Various preprocessing operations can be performed in the analog electronic domain by suitable manipulation of analog signals, for example using comparators, operational amplifiers, transistors, analog memory components, or the like.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for supporting wireless communication operations, the method comprising processing data to perform a multiplication of a pair of matrices to produce a result used in said wireless communication operations, wherein one or both of the pair of matrices comprise complex values, negative values, or a combination thereof, the multiplication comprising:

processing, using electronics, signals indicative of one or both matrices of the pair of matrices to produce further signals indicative of one or more representative pairs of matrices for multiplication, each of the representative pairs of matrices consisting of real values, having a number of rows less than or equal to a row threshold, and having a number of columns less than or equal to a column threshold, and a left-hand matrix of each of the representative pairs of matrices consisting of non-negative values;

causing a photonic computing block to multiply each of the representative pairs of matrices together to produce signals indicative of representative product matrices corresponding to products of said representative pairs of matrices, by processing one or more optical signals using a plurality of optical modulators, each of the plurality of optical modulators operated, based on said further signals, to modulate said optical signals by an amount which is proportional to entries of the representative pairs of matrices; and receiving and processing, using the electronics, the signals indicative of representative product matrices, to produce a product of the multiplication of the pair of matrices.

2. The method of claim 1, further comprising repeating the method iteratively to determine an inverse of an initial matrix corresponding to said result.

3. The method of claim 2, wherein the wireless communication operations comprise multiple-input multiple-output (MIMO) operations, and wherein the initial matrix is used in generating a detection matrix or a precoding matrix for use in the MIMO operations.

4. The method of claim 1, wherein said producing the further signals indicative of the representative pairs of matrices comprises producing signals indicative of a real representation matrix indicative of a complex-valued matrix, the real representation matrix comprising, in block matrix form, an upper-left submatrix, a lower-left submatrix, an upper-right submatrix, and a lower-right submatrix, and wherein:

the upper-left submatrix and the lower-right submatrix both equal a real part of the complex-valued matrix;

one of the upper-right submatrix and the lower-left submatrix equals an imaginary part of the complex-valued matrix; and other of the upper-right submatrix and the lower-left submatrix equals a negative of the imaginary part of the complex-valued matrix.

5. The method of claim 1, wherein said producing the further signals indicative of the representative pairs of matrices comprises:

representing, using electronic signals, a multiplication of a first matrix and a second matrix as a sum of: a first non-negative matrix multiplied by the second matrix; and a second non-negative matrix multiplied by a negative of the second matrix;

determining a most negative entry of the first matrix;

generating the first non-negative matrix from the first matrix by adding an absolute value of the most negative entry to each element of the first matrix; and generating the second non-negative matrix to be of a same size as the first matrix, with each element of the second non-negative matrix being equal to the absolute value of the most negative entry.

6. The method of claim 1, wherein said producing the further signals indicative of the representative pairs of matrices comprises:

for a first matrix and a second matrix to be multiplied together, partitioning one or both of the first matrix and the second matrix into plural submatrices, each of the plural submatrices having a number of rows less than or equal to the row threshold and having a number of columns less than or equal to the column threshold, wherein the representative pairs of matrices comprise the plural submatrices or matrices derived from the plural submatrices, and wherein processing the signals indicative of the representative product matrices comprises performing two or more addition operations, each of the two or more addition operations comprising adding together two or more of said representative product matrices which are produced by multiplying together pairs of the plural submatrices or the matrices derived from the plural submatrices.

7. The method of claim 1, further comprising, by the photonic computing block:

generating, by an optical signal source, a first optical signal comprising a plurality of narrowband component signals of different wavelengths;

modulating, by a first modulation block, each of the plurality of narrowband component signals using a first plurality of optical modulators, each of said first plurality of optical modulators electronically controlled to modulate one of the narrowband component signals by an amount proportional to a corresponding positive entry in a left-hand one of the representative pairs of matrices, by encoding said positive entry as a light intensity into said one of the narrowband component signals;

modulating, by a second modulation block, each of the plurality of narrowband component signals using a second plurality of optical modulators, each of said plurality of optical modulators electronically controlled to modulate one of the narrowband component signals by another amount proportional to a corresponding positive or negative entry in a right-hand one of the representative pairs of matrices, by applying said positive or negative entry as a weight to said one of the narrowband signals; and processing, by an accumulator, the optical signal following modulation by the first modulation block and the second modulation block, said processing comprising accumulating a total power of light of the narrowband component signals, said total power of light corresponding to an entry in a product of multiplying the representative pair of matrices.

8. The method of claim 1, wherein the electronics consist of analog electronics, digital electronics, or a combination thereof.

9. An apparatus for supporting wireless communication operations, the apparatus configured to:

process data to perform a multiplication of a pair of matrices to produce a result used in said wireless communication operations, wherein one or both of the pair of matrices comprise complex values, negative values, or a combination thereof, the apparatus comprising:

electronics configured to process signals indicative of one or both matrices of the pair of matrices to produce further signals indicative of one or more representative pairs of matrices for multiplication, each of the representative pairs of matrices consisting of real values, having a number of rows less than or equal to a row threshold, and having a number of columns less than or equal to a column threshold, and a left-hand matrix of each of the representative pairs of matrices consisting of non-negative values;

a photonic computing block configured to multiply each of the representative pairs of matrices together to produce signals indicative of representative product matrices matrices corresponding to products of said representative pairs of matrices, by processing one or more optical signals using a plurality of optical modulators, each of the plurality of optical modulators operated, based on said further signals, to modulate said optical signals by an amount which is proportional to entries of the representative pairs of matrices; and said electronics or additional electronics configured to receive and process the signals indicative of representative product matrices, to produce a product of the multiplication of the pair of matrices.

10. The apparatus of claim 9, further configured to determine an inverse of an initial matrix corresponding to said result using iterative computation.

11. The apparatus of claim 10, wherein the wireless communication operations comprise multiple-input multiple-output (MIMO) operations, and wherein the initial matrix is used in generating a detection matrix or a precoding matrix for use in the MIMO operations.

12. The apparatus of claim 9, wherein said producing the further signals indicative of the representative pairs of matrices comprises producing signals indicative of a real representation matrix indicative of a complex-valued matrix, the real representation matrix comprising, in block matrix form, an upper-left submatrix, a lower-left submatrix, an upper-right submatrix, and a lower-right submatrix, and wherein:

the upper-left submatrix and the lower-right submatrix both equal a real part of the complex-valued matrix;

one of the upper-right submatrix and the lower-left submatrix equals an imaginary part of the complex-valued matrix; and other of the upper-right submatrix and the lower-left submatrix equals a negative of the imaginary part of the complex-valued matrix.

13. The apparatus of claim 9, wherein said producing the further signals indicative of the representative pairs of matrices comprises:

representing, using electronic signals, a multiplication of a first matrix and a second matrix as a sum of: a first non-negative matrix multiplied by the second matrix; and a second non-negative matrix multiplied by a negative of the second matrix;

determining a most negative entry of the first matrix;

generating the first non-negative matrix from the first matrix by adding an absolute value of the most negative entry to each element of the first matrix; and generating the second non-negative matrix to be of a same size as the first matrix, with each element of the second non-negative matrix being equal to the absolute value of the most negative entry.

14. The apparatus of claim 9, wherein said producing the further signals indicative of the representative pairs of matrices comprises:

for a first matrix and a second matrix to be multiplied together, partitioning one or both of the first matrix and the second matrix into plural submatrices, each of the plural submatrices having a number of rows less than or equal to the row threshold and having a number of columns less than or equal to the column threshold, wherein the representative pairs of matrices comprise the plural submatrices or matrices derived from the plural submatrices, and wherein processing the signals indicative of the representative product matrices comprises performing two or more addition operations, each of the two or more addition operations comprising adding together two or more of said representative product matrices which are produced by multiplying together pairs of the plural submatrices or the matrices derived from the plural submatrices.

15. The apparatus of claim 9, wherein the photonic computing block is further configured to:

generate, by an optical signal source, a first optical signal comprising a plurality of narrowband component signals of different wavelengths;

modulate, by a first modulation block, each of the plurality of narrowband component signals using a first plurality of optical modulators, each of said first plurality of optical modulators electronically controlled to modulate one of the narrowband component signals by an amount proportional to a corresponding positive entry in a left-hand one of the representative pairs of matrices, by encoding said positive entry as a light intensity into said one of the narrowband component signals;

modulate, by a second modulation block, each of the plurality of narrowband component signals using a second plurality of optical modulators, each of said plurality of optical modulators electronically controlled to modulate one of the narrowband component signals by another amount proportional to a corresponding positive or negative entry in a right-hand one of the representative pairs of matrices, by applying said positive or negative entry as a weight to said one of the narrowband signals; and process, by an accumulator, the optical signal following modulation by the first modulation block and the second modulation block, said processing comprising accumulating a total power of light of the narrowband component signals, said total power of light corresponding to an entry in a product of multiplying the representative pair of matrices.

16. The apparatus of claim 9, wherein the electronics consist of analog electronics, digital electronics, or a combination thereof.

* * * * *